United States Patent
Jeswani et al.

(10) Patent No.: US 11,193,637 B2
(45) Date of Patent: Dec. 7, 2021

(54) EMERGENCY BACKUP READY DOWNLIGHT

(71) Applicant: LEDVANCE LLC, Wilmington, MA (US)

(72) Inventors: Anil Jeswani, Acton, MA (US); Renaud Richard, Manchester, NH (US); Ahmed Eissa, Cambridge, MA (US); Zhiming Huang, Taoyuan (CN); Yufeng Wu, Cixi (CN); Hongbiao Hou, Xiamen (CN)

(73) Assignee: LEDVANCE LLC, Wilmington, MA (US)

( * ) Notice: Subject to any disclaimer, the term of this patent is extended or adjusted under 35 U.S.C. 154(b) by 0 days.

(21) Appl. No.: 17/148,625

(22) Filed: Jan. 14, 2021

(65) Prior Publication Data
US 2021/0140597 A1    May 13, 2021

Related U.S. Application Data

(63) Continuation of application No. 16/750,069, filed on Jan. 23, 2020, now Pat. No. 10,920,943.
(Continued)

(51) Int. Cl.
| | |
|---|---|
| *F21S 8/02* | (2006.01) |
| *F21S 9/02* | (2006.01) |
| *F21V 17/16* | (2006.01) |
| *H02J 9/06* | (2006.01) |
| *F21V 23/00* | (2015.01) |
| *F21V 23/02* | (2006.01) |
| *H05B 45/385* | (2020.01) |

(Continued)

(52) U.S. Cl.
CPC ............... *F21S 8/026* (2013.01); *F21S 9/022* (2013.01); *F21V 17/12* (2013.01); *F21V 17/164* (2013.01); *F21V 23/003* (2013.01); *F21V 23/023* (2013.01); *H02J 9/061* (2013.01); *H05B 45/10* (2020.01); *H05B 45/345* (2020.01); *H05B 45/385* (2020.01); *H05B 45/52* (2020.01); *H05B 45/54* (2020.01); *F21Y 2105/18* (2016.08); *F21Y 2115/10* (2016.08)

(58) Field of Classification Search
CPC .......... F21S 9/022; F21S 8/026; F21V 17/12; F21V 17/164; F21V 23/003; F21V 23/023; H02J 9/061; H05B 45/10; H05B 45/345; H05B 45/385; H05B 45/52; H05B 45/54
See application file for complete search history.

(56) References Cited

U.S. PATENT DOCUMENTS

2019/0101257 A1* 4/2019 Boulanger ............. H05B 45/48

* cited by examiner

*Primary Examiner* — Thomas M Sember
(74) *Attorney, Agent, or Firm* — Tutunjian & Bitetto PC

(57) ABSTRACT

A method of adding a backup power source to a luminaire that includes exposing driver circuitry through a back surface of a housing for a luminaire having a downlight geometry. The housing contains a light engine that is positioned to emit light through a light emission end of the housing. The driver electronics controls power received by the luminaire for powering the light engine. The method may continue with connecting a battery junction box having an electrical pathway opening in reversible engagement to the back surface of the housing by snap fit engagement. The method may further include connecting a backup battery unit to the luminaire by wiring extending from the battery backup unit through the electrical pathway opening in the junction box to the driver electronics for the luminaire.

20 Claims, 10 Drawing Sheets

Related U.S. Application Data

(60) Provisional application No. 62/849,549, filed on May 17, 2019.

(51) Int. Cl.
*H05B 45/10* (2020.01)
*H05B 45/52* (2020.01)
*H05B 45/54* (2020.01)
*H05B 45/345* (2020.01)
*F21V 17/12* (2006.01)
*F21Y 105/18* (2016.01)
*F21Y 115/10* (2016.01)

EMERGENCY BACKUP READY DOWNLIGHT

This patent application claims priority to U.S. patent application Ser. No. 16/750,069, titled "EMERGENCY BACKUP READY DOWNLIGHT" filed on Jan. 23, 2020, which claims priority to U.S. Provisional Patent Application 62/849,549, titled "EMERGENCY BACKUP READY DOWNLIGHT" filed on May 17, 2019, which are herein incorporated by reference in their entirety. The present disclosure generally relates to luminaire assemblies employing light emitting diodes as the light source. More specifically, the present disclosure relates to downlights employing light emitting diodes as the light source.

TECHNICAL FIELD

Background

One of the most common light fixtures is the recessed can downlight (RCD) or Non-IC type fixtures, which is an open bottom can that contains a light bulb, most commonly an incandescent bulb or a fluorescent bulb. The fixture is typically connected to the power mains at 120 to 277 volts (or 347 volts), 50/60 Hz. RCDs or Non-IC fixture are generally installed during the construction of a building before the ceiling material (such as plaster or gypsum board) is applied. Therefore, they are not easily removed or substantially reconfigured during their lifetime. Recently, lighting devices have been developed that make use of light emitting diodes (LEDs) for a variety of lighting applications. Owing to their long lifetime and high energy efficiency, integrated LED luminaires are now also designed for replacing traditional incandescent and fluorescent luminaires, i.e., for retrofit applications and/or new construction features. For retrofit applications, the LED fixture is adapted to fit into existing fixture in ceiling. For new construction, the LED luminaire can be directly installed into the ceiling or installed with a new non-IC fixture.

SUMMARY

In one aspect, a luminaire is provided that includes a housing having a downlight geometry and a light engine including light emitting diodes (LEDs), in which the light engine is positioned to emit light through a light emission end of the housing having the downlight geometry. The housing contains driver electronics for controlling power received by the luminaire for powering the light engine. The luminaire includes an access opening on a back surface of the housing, in which the access opening exposes the driver electronics. A primary power line extends to the driver electronics through the housing on a surface separate from the access opening on the back surface of the housing. A battery junction box having an electrical pathway opening is engaged to the back surface of the housing. A backup battery is connected to the luminaire by wiring extending from the battery backup through the electrical pathway opening in the junction box to the driver electronics for the luminaire.

In another embodiment, a luminaire is provided that includes a housing and a light engine including at light emitting diodes (LEDs), in which the light engine is positioned to emit light through a light emission end of the housing. The housing contains driver electronics for controlling power received by the luminaire for powering the light engine. The luminaire includes an access opening on a back surface of the housing, in which the access opening exposes the driver electronics. A main power line extends to the driver electronics through the housing on a surface separate from the access opening on the back surface of the housing. A battery junction box having an electrical pathway opening is reversibly engaged to the back surface of the housing by snap fit engagement. A backup battery is connected to the luminaire by wiring extending from the battery backup through the electrical pathway opening in the junction box to the driver electronics for the luminaire. The main power line of the luminaire and a battery line from the backup battery extend to a main power junction box. In some embodiments, the backup battery is housed in a unit in combination with a battery driver that controls the power from the battery to the luminaire. In some embodiments, the emergency driver draws its power from the battery and drives the light emitting diodes (LEDs) of the light engine for the luminaire in case of a loss of power.

In another aspect, a method of adding a backup power source to a luminaire is provided. In one embodiment, the method includes exposing driver circuitry through a back surface of a housing for a luminaire having a downlight geometry. The housing contains a light engine that is positioned to emit light through a light emission end of the housing. The driver electronics controls power received by the luminaire for powering the light engine. The method may continue with connecting a battery junction box having an electrical pathway opening in reversible engagement to the back surface of the housing by snap fit engagement. The method may further include connecting a backup battery to the luminaire by wiring extending from the battery backup through the electrical pathway opening in the junction box to the driver electronics for the luminaire.

BRIEF DESCRIPTION OF THE DRAWINGS

The following description will provide details of embodiments with reference to the following figures wherein.

DETAILED DESCRIPTION

Figure 1:
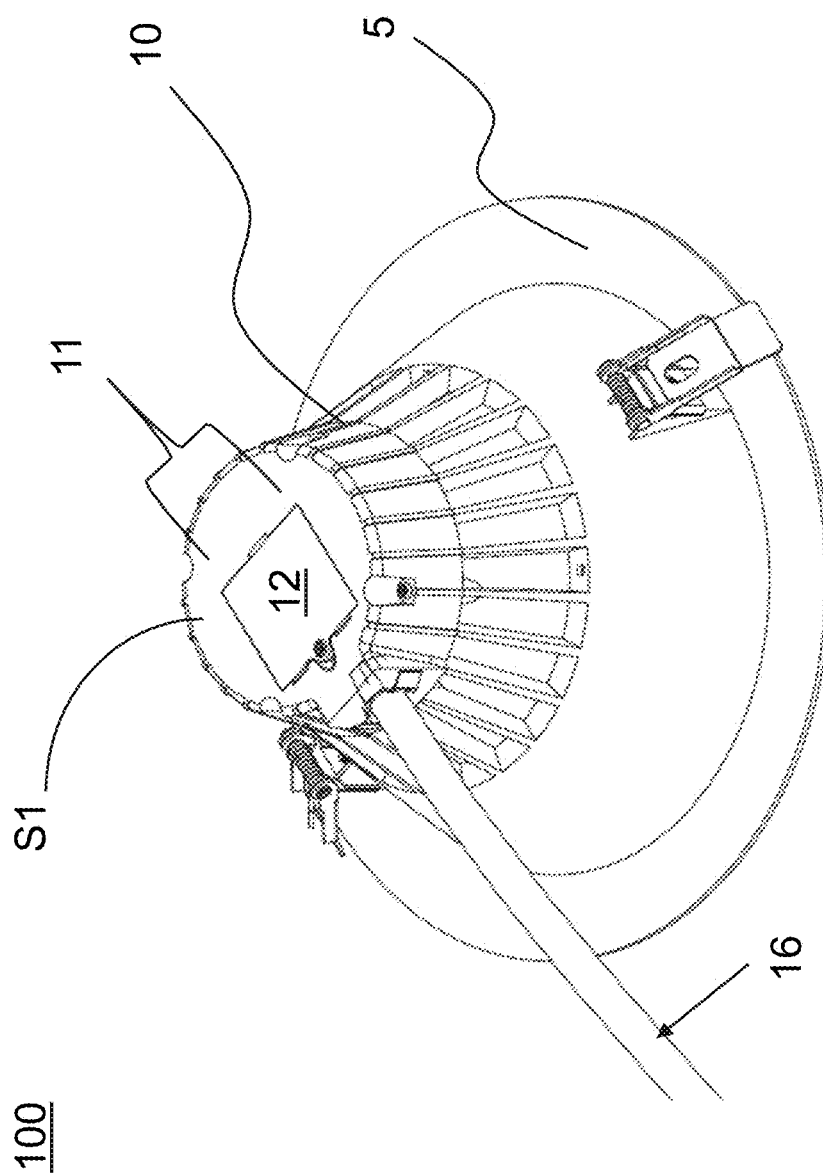
FIG. 1 is a perspective view of luminaire design including a housing having an access panel to the driver electronics of the luminaire, wherein removal of the access panel on a back surface of a downlight housing allows for reversable engagement of a battery junction box for engagement of a backup battery in electrical communication with the driver electronics of the luminaire, in accordance with one embodiment of the present disclosure.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

In some embodiments, the present disclosure provides a downlight that can be reversibly converted to a downlight including a backup battery for emergency power/emergency lighting applications. The structures and methods described herein can provide a light emitting diode (LED) battery backup option that can use an already existing luminaire, which can eliminate the need for an additional luminaire or an expensive inverter type emergency backup enabled device. The downlight designs of the present disclosure include an access opening to the driver electronics of the luminaire, and a connector for connecting, e.g., reversibly connected or permanently connected, such as hard wire connection, a battery back up to the driver electronics, i.e., to the luminaire. The access opening can be closed by a removable access door. In these circumstances, when the battery backup is not in use, an access door installed over the access opening encloses the driver circuitry within the housing of the luminaire. The access door obstructs access to the driver circuitry when the battery backup is not in use. By providing a reversibly conversion from a downlight that does not include a backup battery to the same downlight including a battery backup. The designs of the structures and methods described herein can offer a lower cost alternatives to emergency backup designs when compared to an entire swap out of a downlight that does not include a battery backup with a new downlight having an integral battery backup that cannot be removed.

It has been determined that downlights that can be transformed into emergency lighting units through the use of an inverter emergency system are costlier and less efficient than the designs disclosed herein. In some instances, an installer may use downlights that do not include battery backups with downlights that do include battery backup. For example, the downlights having the battery backup may be used for emergency only fixtures. The mixing of different geometry fixtures to provide both downlights with battery backups and downlights without battery backups does not result in a clean installation, as the differences in the fixtures for the luminaires is clearly visible to those within the room. In some embodiments, the methods and structures provided herein can use the same fixture geometry for both downlights including a battery backup and downlights that don't include a battery backup, which allows for a mixture of battery backup and not battery backup luminaires in a same room with a clean installation. By "clean installation" it is meant there is no visible differences between the fixtures of the luminaires having the battery backup and the fixtures of the luminaires not having the battery backup when viewed by people within the room being illuminated by the different types of luminaires. Further, when compared to installations of downlights without a battery backup in combination with separate, emergency only downlights that do include the battery backup, the downlights of the present disclosure that include a reversible backup battery conversion can save installation costs. The downlights of the present disclosure, which allow for optional integration of battery backup, can also simplify inventory management. More specifically, a single part number may be employed for a standard downlight version and a battery backup enabled downlight version. The battery backup is typically employed in lights that provide illumination in emergency situations. In some embodiments, because the downlights of the present disclosure are reversibly convertible to battery backup enabled lights, the battery backups can be installed in instances of emergency to increase emergency lighting. The battery backups of the present disclosure do not require that the entire fixture be replaced. The methods and structures of the present disclosure allow for flexibility on the customer side, as any downlight having the design disclosed herein into can be converted for being powered by a battery backup, and therefore can provide for an emergency backup option. In this disclosure, the downlights with the design described below can be applied to both new construction and retrofit applications any time that a battery backup is desired.

The luminaire structures of the present disclosure are now described with greater detail with reference to FIGS. 1-10B. In some embodiments, a luminaire 100 is provided including a housing 10 having a downlight geometry and containing a light engine 60 including light emitting diodes (LEDs) 50, in which the light engine 60 is positioned to emit light through a light emission end of the housing 10. In some embodiments, the housing 10 contains driver electronics 200 (the driver electronics 200 are interchangeably referred to as the driver circuit 200) for controlling power received by the luminaire 100 for powering the light engine 60. The housing 10 includes an access opening 11 on a back surface S1 of the housing 10 that exposes the driver electronics 200.

In some embodiments, a battery junction box 30 having an electrical pathway opening 31a, 31b is engaged to the back surface S1 of the housing 10. In some embodiments, a backup battery unit 40 is connected to the driver circuit 200 that is present in the cavity extending from the access opening 11 into the housing 10. In some embodiments, the connection between the backup battery unit 40 and the driver circuit 200 is provided by a first side of wiring 41 extending from the backup battery unit 40 through the electrical pathway opening 31a, 31b of the battery junction box 30 into electrical communication with the driver circuit 200 through the access opening 11 in the housing 10. In some embodiments, the backup battery unit 40 includes a power source, e.g., battery, and a battery driver. The battery driver controls the power from the battery to the luminaire.

In some embodiments, the emergency driver draws its power from the battery and drives the light emitting diodes (LEDs) of the light engine for the luminaire in case of a loss of power.

FIGS. 1-5 and 9A-10B depict one embodiment of a downlight 100 including a light engine 60 having a plurality of solid-state light emitters, e.g., light emitting diodes (LEDs) 50. A "downlight", or recessed light, (also pot light in Canadian English, sometimes can light (for canister light) in American English) is a light fixture that is installed into a hollow opening in a ceiling. When installed it appears to have light shining from a hole in the ceiling, concentrating the light in a downward direction as a broad floodlight or narrow spotlight. "Pot light" or "canister light" implies the hole is circular and the lighting fixture is cylindrical, like a pot or canister. It is noted that the downlights 100 and luminaires of the present disclosure are not limited to having only circular geometries, because the structures and methods described herein are equally applicable to other geometries, such as square and/or rectangular geometry downlights/ luminaires.

Broadly, there are three parts to a downlight fixture: 1) housing, 2) trim and 3) light engine. It is noted that this is not an exclusive list of the elements of a downlight fixture. The trim 5 is the visible portion of the downlight. The trim 5 is the insert that is seen when looking up into the fixture, and also includes the thin lining around the edge of the light. The housing 10 is the fixture itself that is installed inside the ceiling and contains the luminaire holder. It is noted that embodiments are contemplated in which the trim 5 and the housing 10 are integrated together in one piece, and there are embodiments in which the trim 5 and the housing 10 are separate components. There are many different types of light engines 60 that can be inserted into recessed lighting fixtures, i.e., downlights 100. In accordance with the embodiments of the present disclosure, the light engines 60 applicable to the methods and structures described herein include solid state emitters, such as light emitting diodes (LEDs) 50.

The housing 10 may be composed of a metal, such as aluminum (Al), which provides for heat dissipation of any heat produced by the light engine 60. In some embodiments, to provide for increased heat dissipation, a plurality of ridges or fin structures may be integrated into the aluminum housing 10. In some embodiments, the housing 10 may also be composed of a plastic, such a polycarbonate. The construction of the housing 10 may fall into one of four categories for downlights that are recognized in North America. For example, the housing may be constructed for IC or "insulation contact" rated new construction housings are attached to the ceiling supports before the ceiling surface is installed. If the area above the ceiling is accessible these fixtures may also be installed from within the attic space. IC housings are typically required wherever insulation will be in direct contact with the housing. Non-IC rated new construction housings are used in the same situations as the IC rated new construction housings, only they require that there be no contact with insulation and at least 3 in (7.6 cm) spacing from insulation. These housings are typically rated up to 150 watts. IC rated remodel housings are used in existing ceilings where insulation will be present and in contact with the fixture. Non-IC rated remodel housings are used for existing ceilings where, no insulation is present. Non-IC rated remodel housings require that there be no contact with insulation and at least 3 in (7.6 cm) spacing from insulation. Sloped-ceiling housings are available for both insulated and non-insulated ceilings that are vaulted. It is noted that the housing 10 of the downlight of the present disclosure may meet be designed to meet the requirements of any of the aforementioned standards. The housing 10 is typically designed to ensure that no flammable materials come into contact with the hot lighting fixture.

The housing 10 may be dimensioned to be available in various sizes based on the diameter of the circular opening where the downlight 100 is installed. In some examples, the circular opening of the housing 10 may be sized in 4, 5 and 6 inch diameter. It is noted that these dimensions are provided for illustrative purposes only and are not intended to limit the present disclosure. For example, the housing 10 may also have a circular opening in diameters equal to 2 inches or 3 inches.

It is noted that downlight geometries for installation into circular openings is only one embodiment of the present disclosure. Downlight geometries for installation into multisided geometry openings, such as square and rectangular geometries are also within the scope of the present disclosure.

In some embodiments, the housing 10 can also be "Air Tight", which means it will not allow air to escape into the ceiling or attic, thus reducing both heating and cooling costs.

The trim 5 of the downlight 100 is selected to increase the aesthetic appearance of the luminaire. In some embodiments, the trim 5 may be a baffle that is black or white in color. In some embodiments, the trim 5 is made to absorb extra light and create a crisp architectural appearance. There are cone trims which produce a low-brightness aperture. In some embodiment, the trim 5 may be a multiplier that is designed to control the omnidirectional light from the light engine. Lens trim is designed to provide a diffused light and protect the luminaire. Lensed trims are normally found in wet locations. The luminous trims combine the diffused quality of lensed trim but with an open down light component. Adjustable trim allows for the adjustment of the light whether it is eyeball style, which protrudes from the trim or gimbal ring style, which adjusts inside the recess.

The back surface S1 of the housing 10 includes an access opening 11, which provides access to the driver circuit 200. The dimensions of the access opening 11 is selected to allow for a physical electrically conductive pathway, such as a bundle of wiring, to extend therethrough to the driver circuit 200 to provide for connection between the driver circuit 200 that is present in the housing 10. The backup battery unit 40 is connected to the driver circuit 200 of the luminaire 100 by a first wiring portion 41 that extends from the backup battery unit 40 through the electrical pathway opening 31a, 31b of the battery junction box 30 and through the access opening 11 of the housing 10 into electrical communication with the driver circuitry 200. As will be described further herein, the backup battery unit 40 can provide auxiliary power to the driver circuit 200, which in turn can power the light engine 60 of the luminaire 100. For example, the backup battery unit 40 when connected to the driver circuitry 200 can power the light engine 60 of the luminaire 100 in emergency power situations, such as when the main power line 16 can not supply enough power to the luminaire 100 to power the light engine 60. In some embodiments, in addition to a power source, the battery unit 40 also includes an emergency (also referred to as backup) driver that controls the power from the battery to the luminaire. In some embodiments, the emergency driver draws its power from the battery of the battery backup unit 40 and drives the light emitting diodes (LEDs) of the light engine for the luminaire in case of a loss of power.

Figure 2:
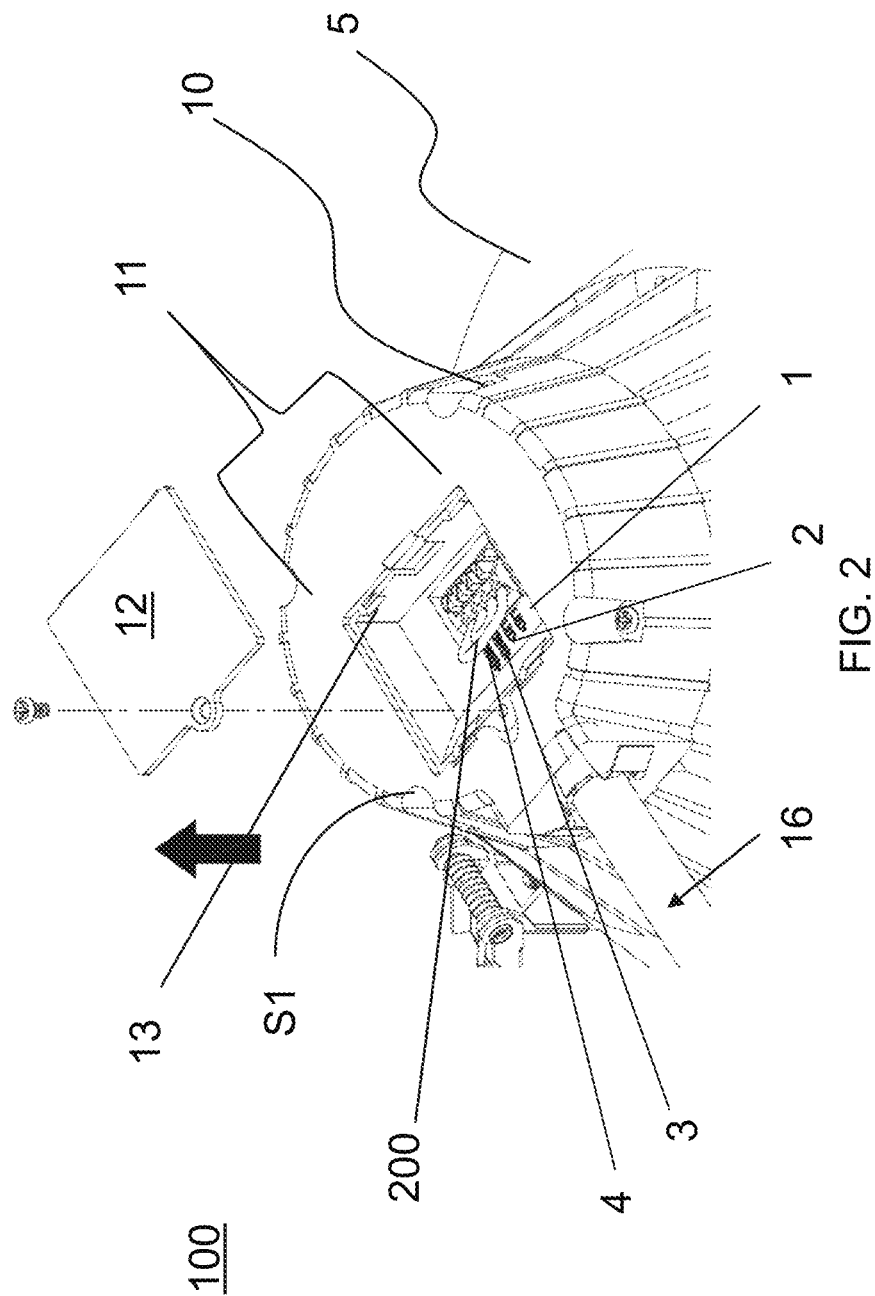
FIG. 2 is a perspective view of the luminaire depicted in FIG. 1 following removal of the access panel from the back surface of the downlight housing to expose the driver electronics of the luminaire.

Referring to FIGS. 1 and 2, on the back surface S1 of the downlight the access opening 11 is positioned that gives access to a connector in direct electrical communication with the driver circuit 200. In some embodiments, an access door 12 may be reversibly engaged to the portion of the back surface S1 of the housing 10 that includes the access opening 11. The "back surface" S1 is the surface of the housing 10 that is opposite the end of the housing 10/luminaire 100 at which light is emitted. The back surface S1 is an exterior surface, and may have at least one planar portion. The term "reversibly engaged" means that the two structures that are engaged may be connected together and disconnected from being in contact with each other. In some embodiments, the connector and the driver circuit 200 are present within the housing 10. When it is not desired to include the backup battery unit 40 to provide auxiliary power to the luminaire 100, the access door 12 may be engaged to the back surface S1 of the housing 10 closing the access opening 11 and encapsulating the driver circuit 200 (as well as the connector) within the housing 10. The access door 12 may be composed of a same or different material as the housing 10. The access door 12 may be engaged to the housing using snap fit engagement. A "snap-fit" (Integral Attachment Feature) engagement is an assembly method used to attach flexible parts, usually plastic, to form the final product by pushing the parts' interlocking components together. The type of snap fit engagement employed to connect the access door 12 to the back surface S1 of the housing 10 to close the access opening 11 may be any type of snap fit engagement, including cantilever, torsional and annular. The access door 12 may also be engaged to the back surface S1 of the housing 10 using nut and bolt arrangements. Both the connector and the driver circuit 200 that is exposed by removing the access door 12 providing the access opening 11, may be encapsulating within the housing 10 by closing the access opening 12 through the installation of the access door 12.

Figure 10B:
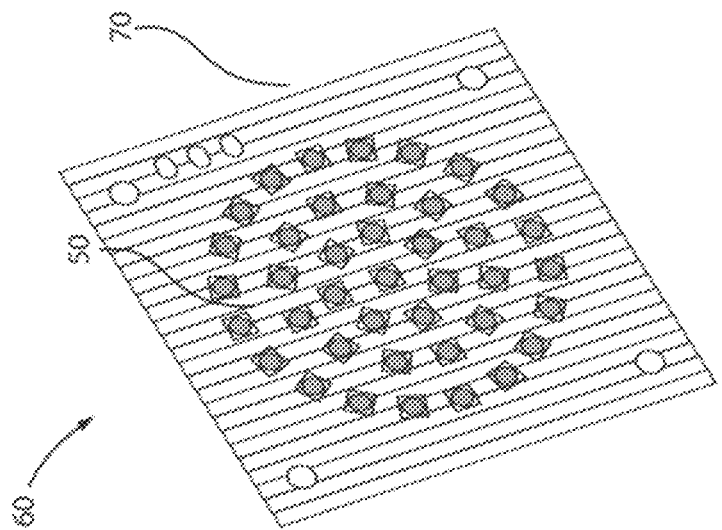
FIG. 10B is a perspective view of the light engine depicted in FIG. 10A.
Figure 10A:
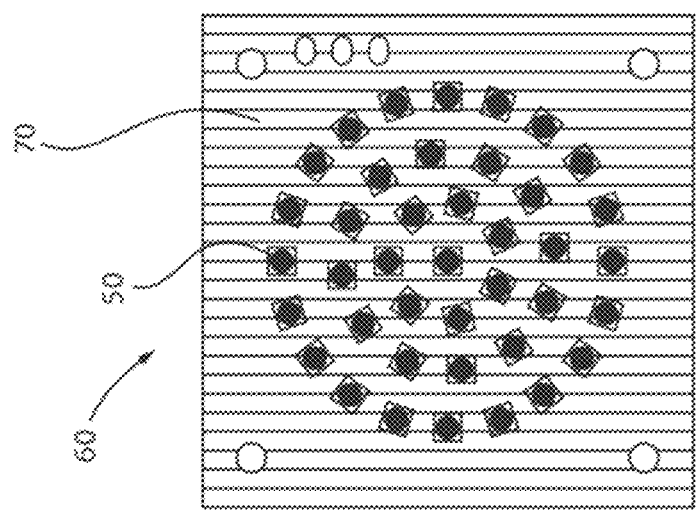
FIG. 10A is a top down view of a light engine including at least one string of light emitting diodes (LEDs) as used in the luminaire designs depicted in FIGS. 1-9B.

The light engine 60 (also referred to as light source) is positioned within the housing 10 and orientated to emit light in a direction through opening of the housing 10 at which the trim 5 is positioned. The light engine produces light from solid state emitters. The term "solid state" refers to light emitted by solid-state electroluminescence, as opposed to incandescent bulbs (which use thermal radiation) or fluorescent tubes, which use a low pressure Hg discharge. Compared to incandescent lighting, solid state lighting creates visible light with reduced heat generation and less energy dissipation. Some examples of solid state light emitters that are suitable for the methods and structures described herein include inorganic semiconductor light-emitting diodes (LEDs), organic light-emitting diodes (OLED), polymer light-emitting diodes (PLED) or combinations thereof. Although the following description describes an embodiment in which the solid-state light emitters are provided by light emitting diodes, any of the aforementioned solid-state light emitters may be substituted for the LEDs. FIGS. 10A and 10B illustrate one example of the light emitting diodes (LEDs) 50 of a light engine 60 that can be utilized within the downlights 100 that are depicted in FIGS. 1-5 and 8-10B.

Referring to FIGS. 10A and 10B, in some embodiments, the light source (also referred to as light engine) for the downlight 100 is provided by plurality of LEDs 50 that can be mounted to the circuit board 60 by solder, a snap-fit connection, or other engagement mechanisms. In some examples, the LEDs 50 are provided by a plurality of surface mount device (SMD) light emitting diodes (LED). The circuit board 70 for the light engine 60 may be composed of a metal core printed circuit board (MCPB). MCPCB uses a thermally conductive dielectric layer to bond circuit layer with base metal (Aluminum or Copper). In some embodiments, the MCPCB use either Al or Cu or a mixture of special alloys as the base material to conduct heat away efficiently from the LEDs thereby keeping them cool to maintain high efficacy.

It is noted that the number of LEDs 50 on the printed circuit board 70 may vary. For example, the number of LEDs 50 may range from 5 LEDs to 70 LEDs. In another example, the number of LEDs 50 may range from 35 LEDs to 45 LEDs. It is noted that the above examples are provided for illustrative purposes only and are not intended to limit the present disclosure, as any number of LEDs 50 may be present the printed circuit board 70. In some other examples, the number of LEDs 50 may be equal to 5, 10, 15, 20, 25, 30, 35, 40, 45, 50, 55, 60, 65 and 70, as well as any range of LEDs 50 with one of the aforementioned examples as a lower limit to the range, and one of the aforementioned examples as an upper limit to the range.

The LEDs 50 may be arranged as strings on the printed circuit board 70. When referring to a "string" of LEDs it is meant that each of the LEDs in the string are illuminated at the same time in response to an energizing act, such as the application of electricity from the driving electronics, e.g., driver, in the downlight 100. The LEDs 50 in a string of LEDs are electrically connected for this purpose. For example, when a string of LEDs 50 is energized for illumination, all of the LEDs in the string are illuminated. Further, in some embodiments, illuminating the first string of LEDs 50 does not illuminate the LEDs in the second string of LEDs 50, and vice versa, as they are independently energized by the driving electronics, and not electrically connected. It is also noted that the same LED may be shared by more than one string.

In one embodiment, the LEDs 50 may be illuminated to provide an intensity of light emitted by the light engine 60 for the downlight 100 that can range from 300 lumens (LM) to 1500 lumens (LM). In some other examples, the LEDs 50 of the light engine 60 may illuminated to provide an intensity of light that is equal to 350 lumens (LM) 500 lumens (LM), 550 lumens (LM), 700 lumens (LM), 750 lumens (LM), 1200 lumens (LM), 5000 lumens (LM), as well as any range of intensity values included one of the aforementioned values for the lower end of the range, and one of the aforementioned values for the upper end of the range.

In some embodiments, the LEDs 50 of the luminaire 100 are selected to be capable of being adjusted for the color of the light they emit. The term "color" denotes a phenomenon of light or visual perception that can enable one to differentiate objects. Color may describe an aspect of the appearance of objects and light sources in terms of hue, brightness, and saturation. Some examples of colors that may be suitable for use with the method of controlling lighting in accordance with the methods, structures and computer program products described herein can include red (R), orange (O), yellow (Y), green (G), blue (B), indigo (I), violet (V) and combinations thereof, as well as the numerous shades of the aforementioned families of colors. It is noted that the aforementioned colors are provided for illustrative purposes only and are not intended to limit the present disclosure as any distinguishable color may be suitable for the methods, systems and computer program products described herein.

The LEDs 50 of the luminaire 100 may also be selected to allow for adjusting the "color temperature" of the light they emit. The color temperature of a light source is the temperature of an ideal black-body radiator that radiates light of a color comparable to that of the light source. Color temperature is a characteristic of visible light that has applications in lighting, photography, videography, publishing, manufacturing, astrophysics, horticulture, and other fields. Color temperature is meaningful for light sources that do in fact correspond somewhat closely to the radiation of some black body, i.e., those on a line from reddish/orange via yellow and more or less white to blueish white. Color temperature is conventionally expressed in kelvins, using the symbol K, a unit of measure for absolute temperature. Color temperatures over 5000 K are called "cool colors" (bluish white), while lower color temperatures (2700-3000 K) are called "warm colors" (yellowish white through red). "Warm" in this context is an analogy to radiated heat flux of traditional incandescent lighting rather than temperature. The spectral peak of warm-colored light is closer to infrared, and most natural warm-colored light sources emit significant infrared radiation. The LEDs 50 of the luminaires provided by the present disclosure in some embodiments can be adjusted from 2000K to 7000K. In some embodiments, the color temperatures that can be emitted by the LEDs 50 of the light engine 60 can be equal to 3000K, 3500K, 4000K or 5000K.

In some embodiments, the LED light engines 60 for the downlight may provide the that downlight be an SMD (Surface Mount Diode) downlight and/or a COB (Chip on Board) downlights. In some embodiments, the LEDs 50 may be selected to be SMD type emitters, in which the SMDs are more efficient than COBs because the light source produces higher lumens per watt, which means that they produce more light with a lower wattage. In some embodiments, the SMD type LEDs 50 can produce a wider beam of light which is spread over a greater area when compared to light engines of COB type LEDs. This means that less material is needed for the heat sink, which in turn means that they are more economical. SMD downlights can be covered with a frosted reflector which hides the LED chip array, and spreads the light evenly. SMD downlights can produce a wide spread of light. In some example, the wide beam angle of the light emitted from SMD downlights means they can be suitable for larger rooms like living rooms, bedrooms, kitchens and bathrooms.

A Chip On Board (COB) LED Downlight consists of a single LED chip, mounted on the downlight, compared to an array of LED's like an SMD. COB LEDs are basically multiple LED chips (typically nine or more) bonded directly to a substrate by the manufacturer to form a single module. The ceramic/aluminum substrate of COB LEDs also acts as a higher efficiency heat transfer medium when coupled to an external heatsink, further lowering the overall operating temperature of the assembly. Since the individual LEDs used in a COB are chips, the chips can be mounted such that they take up less space and the highest potential of the LED chips can be obtained. When the COB LED package is energized, it appears more like a lighting panel than multiple individual lights as would be the case when using several SMD LEDs mounted closely together. In some embodiments, because the single cluster of LED's 50 are mounted in one point, they can require greater cooling, so a heat sink, usually made of aluminum, may be mounted to dissipate the heat.

A light engine of COB type LEDs 50 can provide a more focused light and with the use of reflectors, the light beam can be more controlled when compared to a light engine that is composed of SMD LEDs. Chrome reflectors surrounding the diode can be replaced and set at different angles to make the light beam narrower or wider. Due to the narrow beam and with the use of reflectors that are usually clear, COB lights generate crisper and cleaner as there is no frosting on the lenses, which cuts down the clarity of the LED light. Due to the clear lenses, more light can penetrate further which means they perform well in rooms with high ceilings.

It is noted that the above description of the light emitting diodes (LEDs) 50 is provided for illustrative purposes only, and is not intended to limit the present disclosure. For example, In some embodiments, other light sources may either be substituted for the LEDs 50, or used in combination with the LEDs 50, such as organic light-emitting diodes (OLEDs), a polymer light-emitting diode (PLED), and/or a combination of any one or more thereof.

Figure 6:
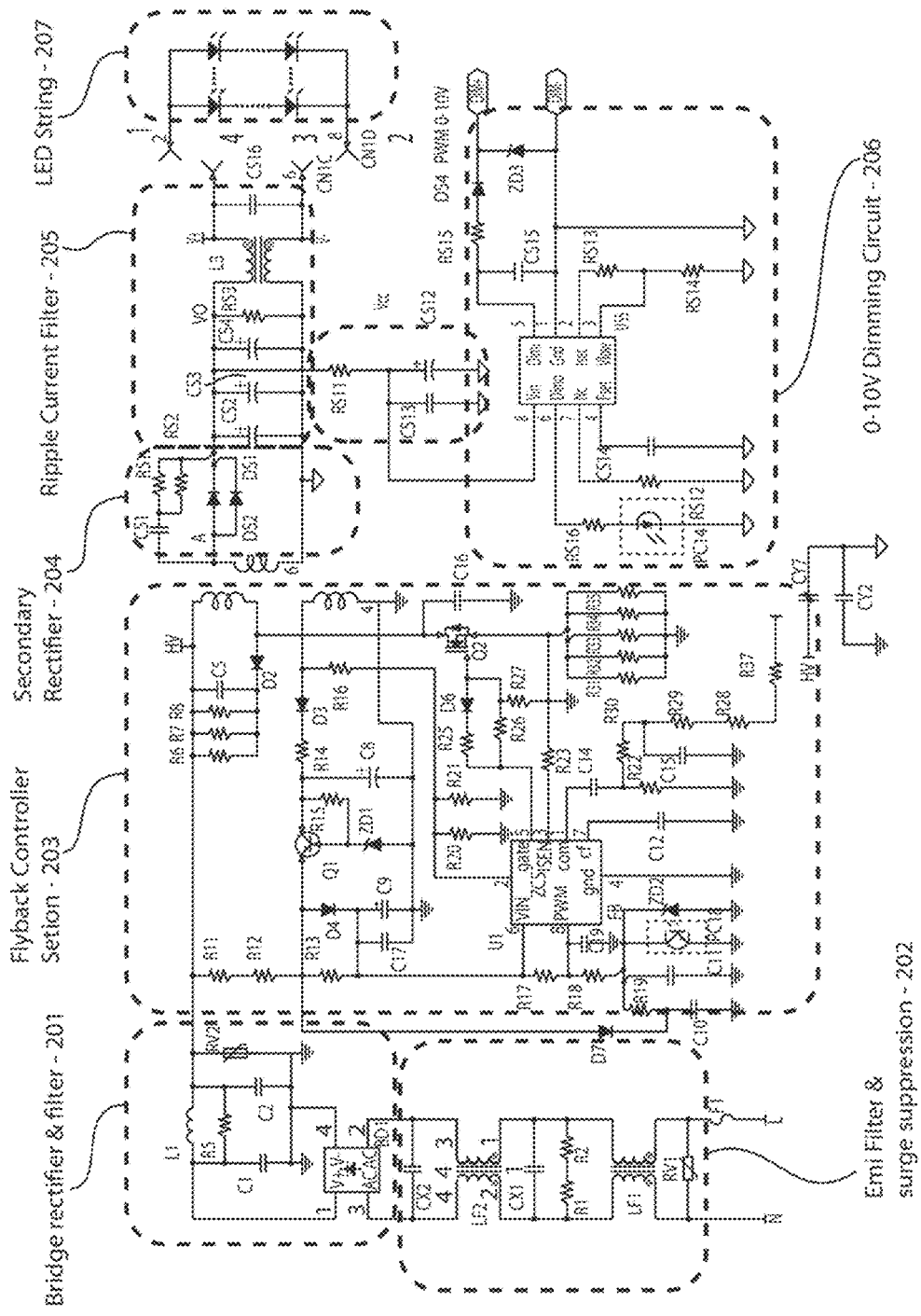
FIG. 6 is a circuit diagram illustrating the driver circuitry of the luminaire depicted in FIGS. 2 and 3, in accordance with one embodiment of the present disclosure.

Referring to FIGS. 2, 3, 4, 6, 8 and 9A-9B, a connector is present within the housing 10 for electrical connection with the driver circuit 200. The driver circuit 200 receives power from the primary power line 16 and converts the power to a form that is useable by the light engine 60 of the luminaire 100. FIG. 6 is a circuit diagram illustrating the driver circuitry 200 of the luminaire 100 depicted in FIGS. 2 and 3, in accordance with one embodiment of the present disclosure.

The connector that is present within the housing 10 allows for electrical connection of the first wiring portion 41 of the backup battery unit 40 to the driver circuitry 200 of the luminaire 100, so that when the primary power line 16 fails to power the light engine 60 of the luminaire 100, suitable power for energizing the light emitting diodes (LEDs) 50 of the light engine 60 is provided by the backup battery unit 40.

The connector of the driver circuit 200 for engagement by the first wiring portion 41 of the backup battery unit 40 is accessible through the access opening 11 in the back surface S1 of the housing 10. It is noted that the sidewalls extending from the access opening 11 into the cavity that contains the driver circuit 200 may include snap features 13, e.g., receiving recesses for retaining tabs that can deform and deflect into engagement of the receiving recesses. In some embodiments, the snap features 13 may be employed to engage the access door 12 to the housing 10. In other embodiments, the snap features in the sidewalls extending from the access opening 11 into the cavity that contains the driver circuit 200 may contribute to engaging the battery junction box 30 to the back surface S1 of the housing 10.

The battery junction box 30 may include an electrical pathway opening 31a, 31b having dimensions to allow for physical electrical communication structures, such as wiring, to extend from the backup battery 40 through the electrical pathway opening 31a, 31b into electrical, e.g., communication, via contact, to the driver circuitry 200. The first portion 31a of the electrical pathway opening 31a, 31b is present in a sidewall of the battery junction box 30. The second portion 31b of the electrical pathway opening 31a, 31b is present at a base of the battery junction box 30.

The battery junction box 30 may be composed of a metal, such as aluminum (Al). In some embodiments, the battery junction box 30 may also be composed of a plastic, such a polycarbonate. The material that provides the battery junction box 30 may be the same composition or a different composition from the material that provides the housing 10.

The battery junction box 30 can be engaged, e.g., reversibly engaged, to the back surface S1 of the housing 10 by snap-fit engagement. For example, the battery junction box 30 may include engagement members for engaging, e.g., reversibly engaging, the snap features 13, e.g., receiving recesses, of the housing 10. The engagement features of the battery junction box 30 may be selected depending upon the type of snap-fit engagement being used between the battery junction box 30 and the housing 10. Three examples of snap-fit engagement suitable for joining the junction box 30 and the housing 10 can include annular snap fit engagement, cantilever snap fit engagement, and torsional snap fit engagement. Snap-fit joints have a design that includes a protruding edge and a snap-in area. The annular snap-fit utilizes hoop-strain to hold into place. Hoop-strain is the expansion of the circumference of the more elastic piece as it is pushed onto the more rigid piece. In most cases the design is circular. This kind of snap-fit can be used multiple times. A cantilever design can be multiple use or permanent. A multiple use snap-fit usually has a lever or pin to be pushed, in order to undo the snap-fit. However, on a permanent snap-fit there is no lever or pin. In a torsional snap fit, one must deflect, or force the protruding edges of a first piece away from the insertion area a second piece. The second piece then slides in between the protruding edges until the desired distance is reached. The edges of first piece is then released and the second piece is held in place. In some embodiments, the battery junction box 30 may include members having protruding edges to engage the snap features 13, e.g., receiving recesses, of the housing 10.

In other embodiments, the battery junction box 30 engages the back surface S1 of the housing 10 by nut and bolt arrangements or threaded fasteners.

In some embodiments, the second portion 31b of the electrical pathway opening 31a, 31b that is present through the base of the battery junction box 30 is substantially aligned to the access opening 11 in the housing 10 to provide that a passageway extends from the cavity containing the driver circuits 200 through the second portion of the electrical pathway opening 31b of the base of the battery junction box 30. The first portion 31a of the electrical pathway opening 31a, 31b is present through the sidewall of the battery junction box 30. The first portion 31a of the electrical pathway opening 31a, 31b is an opening having a geometry suitable for allowing the first wiring portion 41 to pass through the sidewall of the battery junction box 30.

Figure 4:
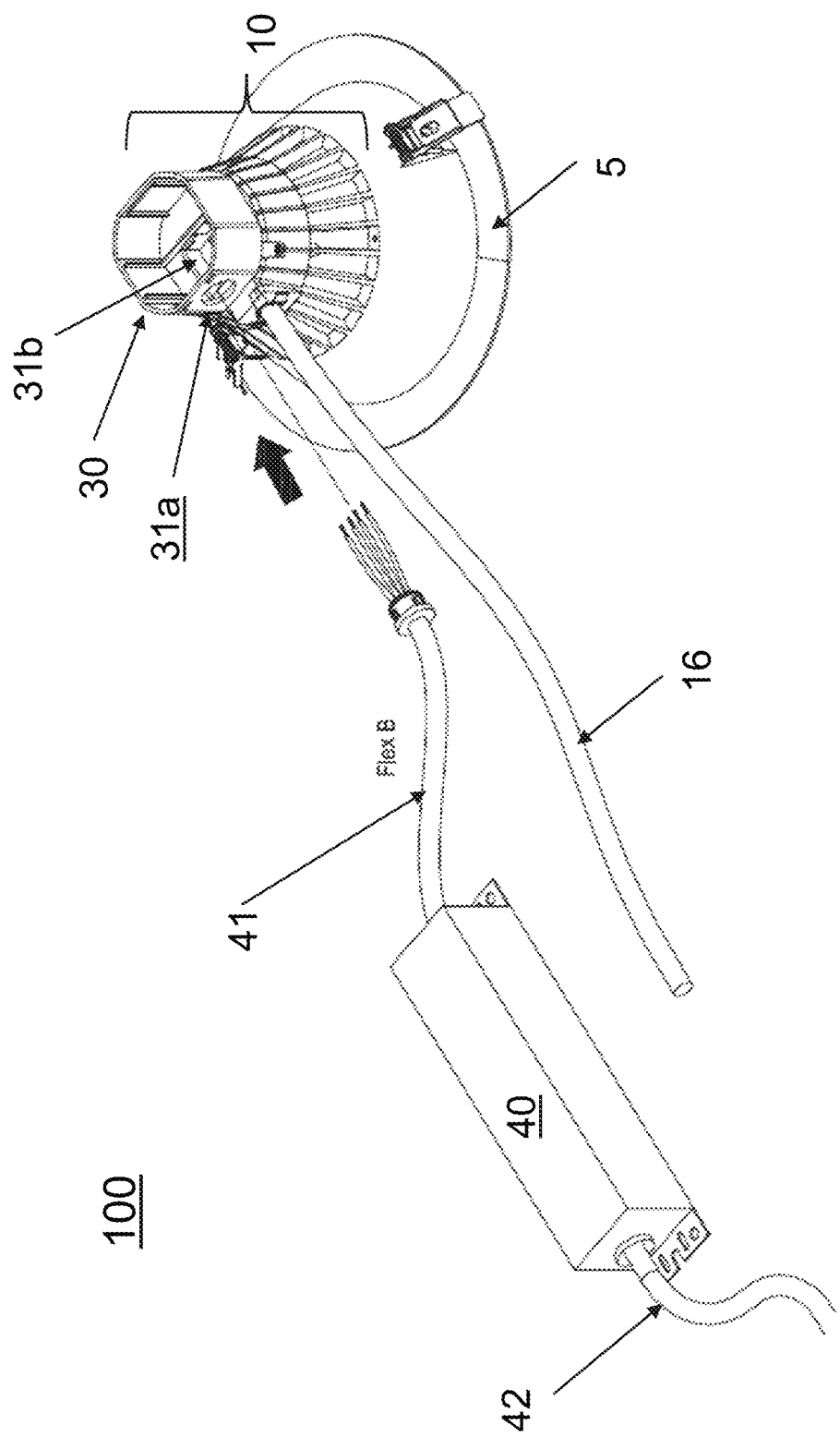
FIG. 4 is a perspective view of a backup battery being connected to the luminaire by wiring extending from the battery backup through the electrical pathway opening in the junction box to the driver electronics for the luminaire, in accordance with one embodiment of the present disclosure.

FIG. 4 depicts a backup battery unit 40 being connected to the luminaire 100 by wiring, e.g., the first wiring portion 41, that is extending from the battery backup unit 40 through the electrical pathway opening 31a, 31b in the junction box 30 to the driver electronics 200 for the luminaire 100. In some embodiments, the backup battery unit 40, i.e., the units including the backup battery, may also contain their own driver (referred to herein as a battery driver or emergency driver) in which the battery driver regulates the current delivered to the light engine of the luminaire 100.

The term "battery" can denote a structure, e.g., container, consisting of one or more cells, in which chemical energy is converted into electricity and used as a source of power. In some embodiments, the battery employed in the battery backup unit 40 may be a lithium iron phosphate (LiFePO$_4$) composition type battery. Lithium Iron Phosphate (LiFePO$_4$, LFP) is a kind of Li-Ion rechargeable battery for high power applications. LFP cells feature with high discharging current, non-explosive, long cycle life (>2000@0.2 C rate, IEC Standard), but its energy density is lower than normal Li-Ion cell (Li—Co) (higher NiMH cell). In other embodiments, the composition of the backup battery unit 40 may be a Lithium-Manganese Oxide Battery, Lithium-Nickel Manganese Cobalt Oxide Battery, Lithium-Titanite Battery, Lithium-Cobalt Oxide Battery or combinations thereof. It is not required that the battery composition be a lithium containing composition. For example, the battery composition may be composed of a nickel cadmium (NiCd) composition, a nickel metal hydride (NiMH) composition, combinations thereof or other like compositions. In one example, the battery in the backup battery unit 40 has a type that is LiFePO$_4$ with 9.6 VDC.

In some embodiments, the battery driver that regulates the current delivered from the battery of the battery backup unit 40 to the light engine, e.g., light emitting diodes (LEDs) of the luminaire 100, may regulate the power supplied to the LED fixture and operate off of a battery instead of line voltage. In some examples, because they operate off a battery, the light output, i.e., the light produced by the luminaire, powered solely by the battery backup unit 40 is not as bright as the luminaire 100 normally would produce off the line voltage, but it will be enough lighting in an emergency situations. The battery driver of the battery backup unit 40 can operate LED fixtures in a wide range of wattages.

In some examples, the battery driver is a 6 watt (6 W) emergency driver. For example, when the AC power fails, the battery driver can power the luminaire 100 in emergency mode, operating the light emitting diodes (LEDs) of the light engine of the luminaire at a reduced lumen output solely with the battery power of the battery backup unit 40 for a minimum of 90 minutes. For example, the combination of the battery and battery driver of the battery backup unit 40 can deliver 6 watts (6 W) to an LED load (measured at nominal battery voltage) for 90 minutes in the emergency mode. It is noted that this is only one example, and in other examples the battery backup unit 40 can deliver 5 watts (5 W), 7 watts (W) or 8 watts (8 W) or other values. In some embodiments, when the AC power is restored the system can switch from emergency mode to normal operation mode. After the system comes back to normal operation from the emergency operation the battery driver 40 ensures that the battery charges to its capacity.

The backup battery unit 40 may have an output current ranging from 100 mA to 1050 mA. The backup battery unit 40 may have an output voltage ranging from 11V to 56V. The backup battery unit 40 may have an output power equal to 25 W MAX. The backup battery unit 40 can have an input voltage of 120~347 VAC 50/60 Hz. The input current of the backup battery unit 40 can be 150 mA MAX. The recharge power can be 8 W MAX. It is noted that the aforementioned performance characteristics for the backup battery unit 40 are provided for illustrative purposes only, and are not intended to limit the disclosure to only these examples.

Figure 5:
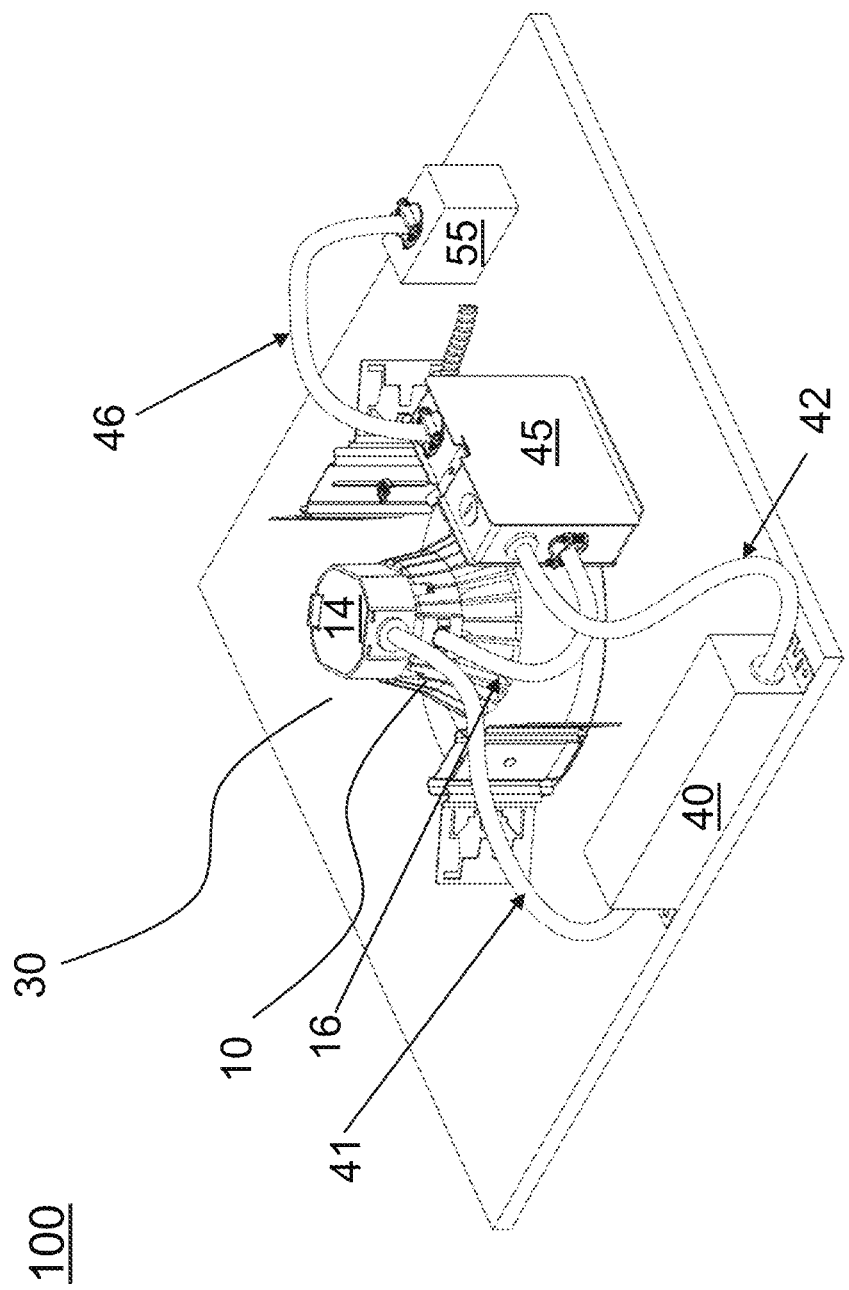
FIG. 5 is a perspective view of a main power junction box connected to a main power line of the luminaire and a battery line from the backup battery, in accordance with one embodiment of the present disclosure.

FIG. 5 depicts one embodiment of a main power junction box 45 connected to a main power line 16 of the luminaire 100 and a battery line, e.g., second wiring portion 42, from the backup battery unit 40. In one embodiment, the luminaire 100 may include a housing 10 and a light engine 60 including at least one light emitting diode (LED) 60. The light engine 60 is positioned to emit light through a light emission end of the housing 10. The housing 10 contains driver electronics 200 for controlling power received by the luminaire 100 for powering the light engine 60. The luminaire 100 includes an access opening 11 on a back surface S1 of the housing 10, in which the access opening 11 exposes the driver electronics 200. In some embodiments, the luminaire 100 includes a main power line 16 extends to the driver electronics 200 through the housing 10 on a surface that is separate from the access opening 11 on the back surface S1 of the housing 10. In some embodiments, a battery junction box 30 having an electrical pathway opening 30a, 30b is reversibly engaged to the back surface S1 of the housing by snap fit engagement. In some embodiments, a backup battery unit 40 is connected to the luminaire 100 by wiring, e.g., a first wiring portion 41, extending from the battery backup 40 through the electrical pathway opening 31a, 31b in the battery junction box 30 to the driver electronics 200 for the luminaire 100. In some embodiments, a main power junction box 45 is connected to the main power line 16 of the luminaire 100. The main power junction box 45 is also connected to a battery line, e.g., second wiring portion 42, extending from the backup battery unit 40. In some embodiments, the main power junction box 45 is in electrical communication, e.g., across test wiring 46, to a test switch 55. FIG. 5 depicts one embodiment of a cover 14 being engaged onto the battery junction box 30. The engagement of the cover 14 to the junction box 30 may be by snap fit engagement. The engagement of the cover 14 to the junction box 30 can be reversible.

Figure 3:
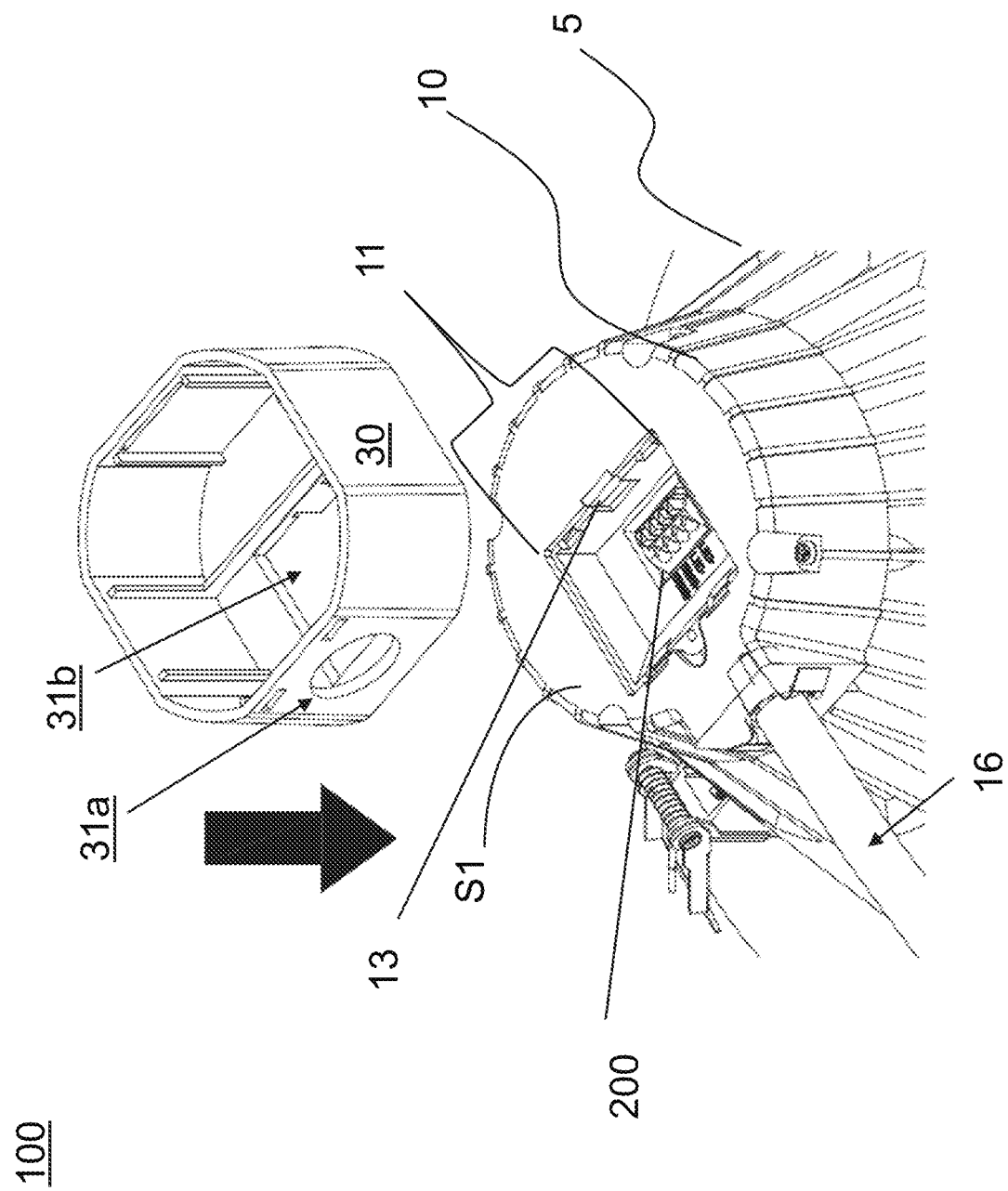
FIG. 3 is a perspective view of the luminaire depicted in FIG. 2 illustrating the engagement of a battery junction box to the back surface of the downlight housing after the access panel to the driver electronics has been removed, wherein the battery junction box includes at least one electrical pathway opening to the electronics of the driver, in accordance with one embodiment of the present disclosure.

FIG. 6 is a circuit diagram illustrating the driver circuitry 200 that is housed within the luminaire depicted in FIGS. 2 and 3, in accordance with one embodiment of the present disclosure. The driver circuitry 200 depicted in FIG. 6 is separate from the battery driver of the battery backup unit 40.

In one embodiment, the driver circuitry 200 that is housed within the luminaire 100 that is depicted in FIG. 6 may include a bridge rectifying and filter circuit 201, an electromagnetic interference filter (EMI) and surge suppression circuit 202, a flyback controller section 203, a secondary rectifier 204, a ripple current filter 205, and a dimming circuit 206.

The connections between the circuit diagram depicted in FIG. 6 for the driver circuit 200 within the housing of the luminaire 100 and the circuitry for the backup battery unit 40 depicted in FIG. 2 have the same reference numbers. For example, reference numbers 1, 2, 3, and 4 of FIG. 6 illustrate on the circuit diagram the physical connections identified by reference numbers 1, 2, 3, and 4 in FIG. 2. For example, reference number 1 (LED+) for the wiring of the circuit depicted in FIG. 6 connects to reference number 1 of the physical depiction of the connections depicted in FIG. 2. For example, reference number 2 for the wiring of the circuit depicted in FIG. 6 connects to reference number 2 (LED−) of the physical depiction of the connections depicted in FIG. 2. For example, reference number 3 (DRV−) for the wiring of the circuit depicted in FIG. 6 connects to reference number 3 of the physical depiction of the connections depicted in FIG. 2. For example, reference number 4 (DRV+) for the wiring of the circuit depicted in FIG. 6 connects to reference number 4 of the physical depiction of the connections depicted in FIG. 2.

The bridge rectifier and filter circuit 201 of the electronics package 200 includes a bridge rectifier that rectifies the AC input voltage into a pulsating DC voltage. The filter filters the high frequency noise.

The EMI filter and surge protection circuit 202 of the electronics package 200 includes an EMI filter to filter the high frequency noise generated by the flyback converter from entering the mains input terminals of line and neutral. The surge protector protects the luminaire from the surge caused by events such as lightning and disturbances on the mains grid. The Surge protector absorbs the energy and limits the peak voltage to a safe level.

The circuit 200 depicted in FIG. 6 may include a flyback transformer. The flyback transformer is used in both AC/DC and DC/DC conversion with galvanic isolation between the input and any outputs. The flyback transformer is a buck-boost converter with the inductor split to form a transformer, so that the voltage ratios are multiplied with an additional advantage of isolation. The flyback transformer may include a flyback controller circuit 203, a secondary rectifier 204 and a ripple current filter 205. This section of the electronics package 200 generates the required voltage and current as per the need of the LED strings 207.

The 0 to 10V dimming circuit 206 is the section accepts the input from the 0 to 10V dimmer and generates corresponding signal for dimming. This enables the change of output current from power supply going into LEDs to be controlled by the external 0 to 10V dimmer. For example, the 0-10V dimming circuit 206 is in electric communication with a 0-10V dimming wall switch. The 0-10V dimming circuit 206 is in electrical communication with the LEDs 207. The 0-10V dimming circuit 206 may be referred to as a 0-10 dimmable LED driver. In lighting control applications, "0-10" describes the use of an analog controller to adjust the voltage in a 2-wire (+10 VDC and Common) bus connecting the controller to one or more LED drivers equipped with a 0-10 VDC dimming input.

A 0-10V dimmable LED driver includes a dedicated dimming circuit inside the LED power supply that produces approximately 10 VDC at its Dim terminal that is connected to external dimmer. It sources an amount of current in order to maintain the variation in dimming voltage between 0-10 VDC. The controlled lighting should scale its output so that at around 10 VDC, the controlled light should be at 100% of its potential output, and at around 0 VDC it should at the lowest possible dimming level.

Figure 7:
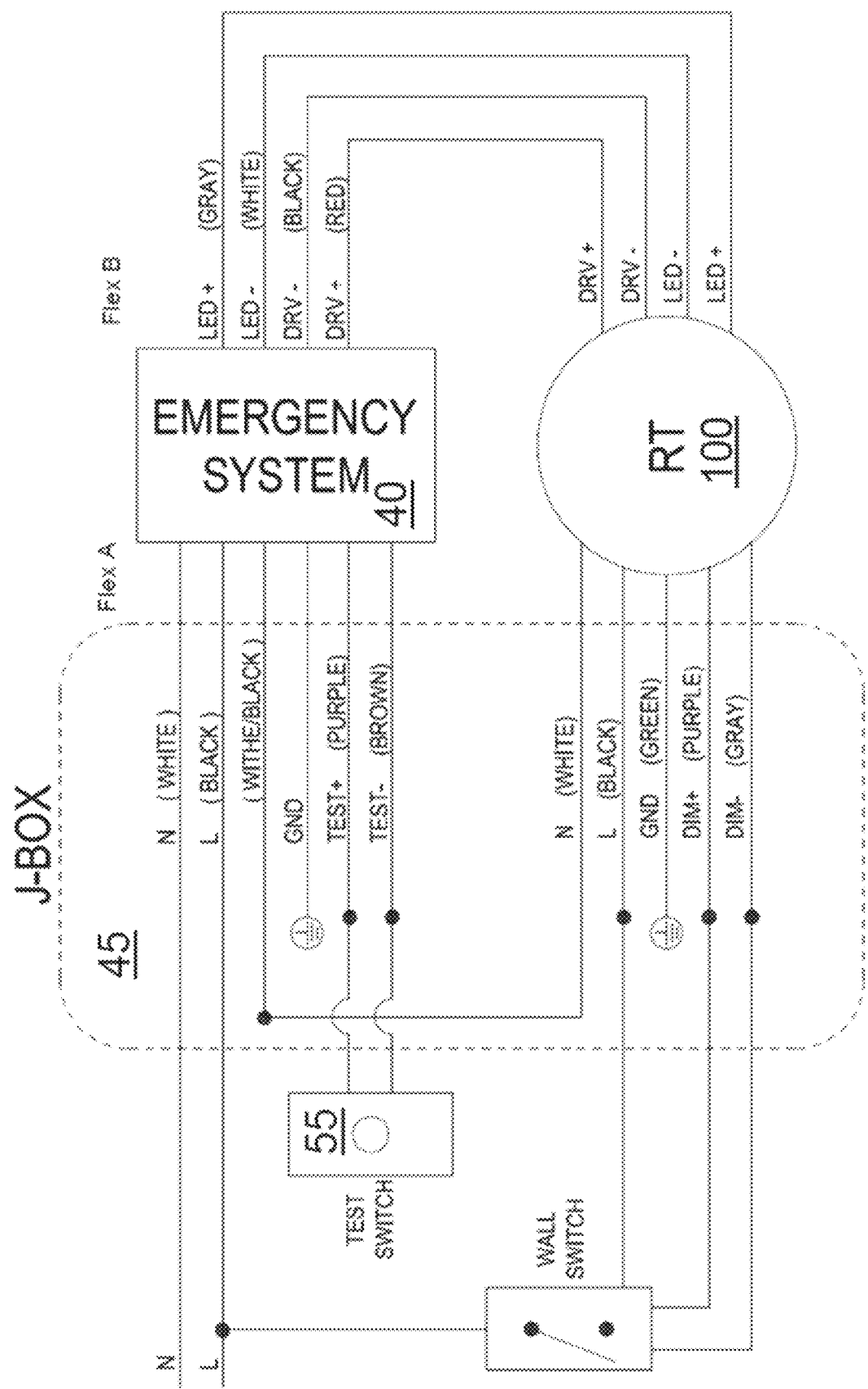
FIGS. 7 and 8 are circuit diagrams illustrating the connectivity of the downlight including the battery junction box, the main power junction box, a wall switch, a test switch and the backup battery, in accordance with one embodiment of the present disclosure.
Figure 8:
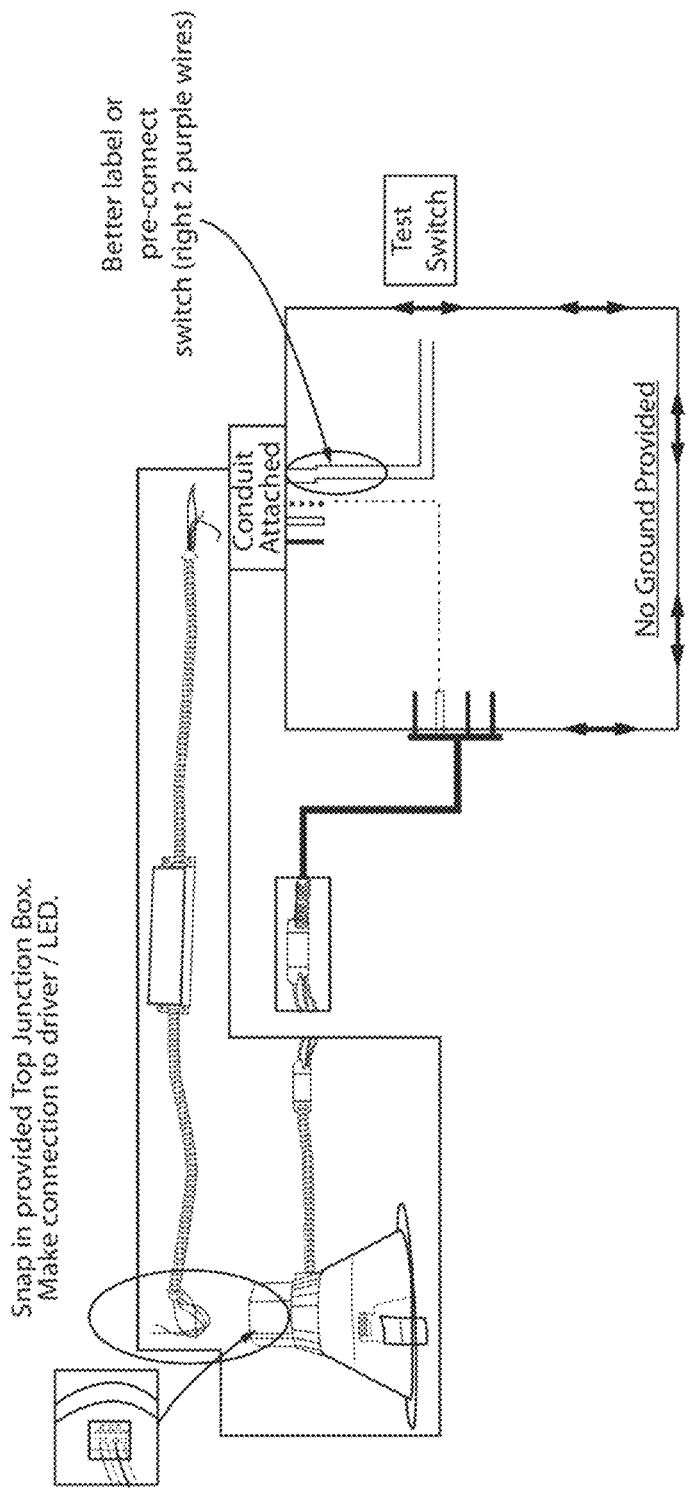
Figure 9B:
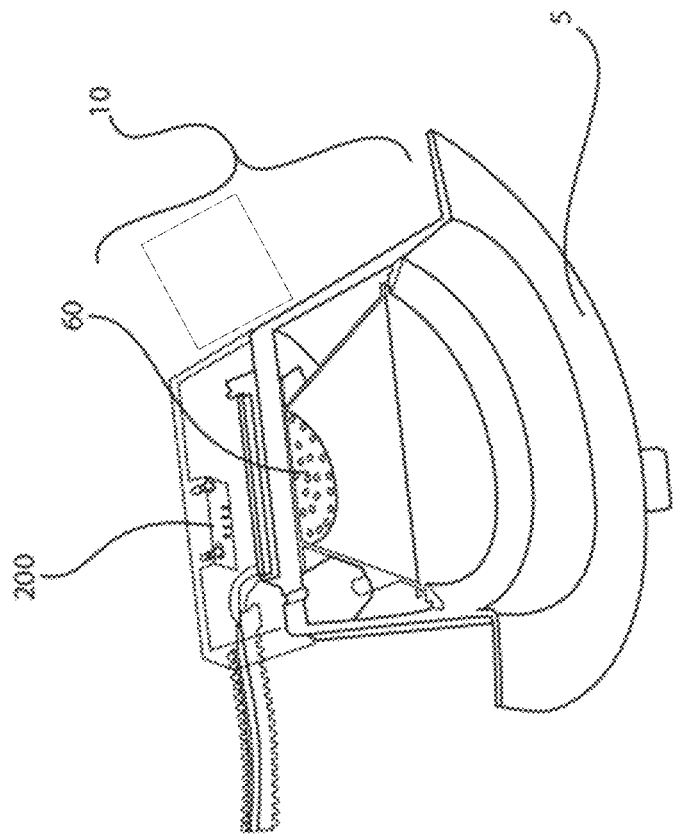
FIG. 9B is a cross-sectional view of the luminaire design depicted in FIG. 9A.
Figure 9A:
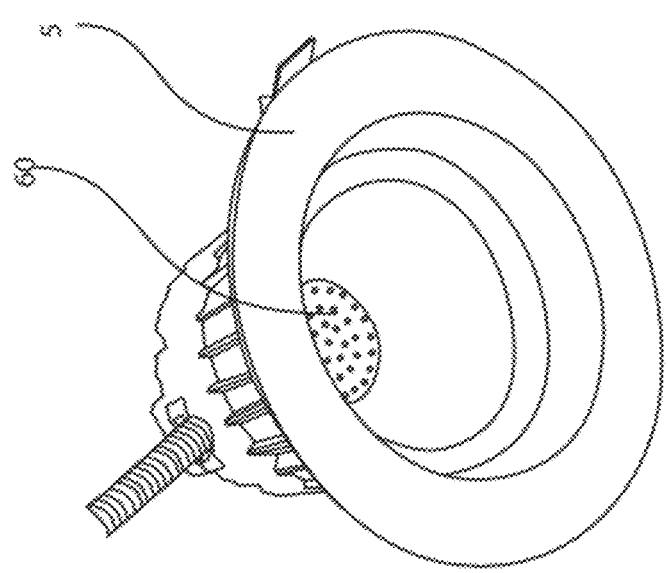
FIG. 9A is a perspective view of a downlight geometry luminaire that has been tilted to depict the light engine including at least one string of light emitting diodes, in accordance with one embodiment of the present disclosure.

FIGS. 7 and 8 are circuit diagrams illustrating the connectivity of the downlight including the battery junction box 30 of a luminaire 100, the main power junction box 45, a wall switch 60, a test switch 55 and the backup battery 40, in accordance with one embodiment of the present disclosure.

In another aspect, a lighting method is provided. The method of adding a backup power source, e.g., backup battery 40, to a luminaire 100 is provided that can include exposing driver circuitry 200 through a back surface S1 of a housing 10 for a luminaire 100 having a downlight geometry. In some embodiments, the housing 10 contains a light engine 60 that is positioned to emit light through a light emission end of the housing 10. The driver circuitry 200 controls power received by the luminaire 100 for powering the light engine 60. The method further includes connecting a battery junction box 30 having an electrical pathway opening 31a, 31b in reversible engagement to the back surface S1 of the housing 10 by snap fit engagement. The method may further include connecting a backup battery 40 to the luminaire 100 by wiring extending from the battery backup 40 through the electrical pathway opening 31a, 31b in the battery junction box 30 to the driver electronics 200 for the luminaire 100. In some embodiments, the method further includes connecting a main power line 16 of the luminaire 100 and a battery line 42 from the backup battery 40 to a main power junction box 45. In some embodiments, the method further includes connecting a test switch 55 to the main power junction box 45.

In some examples, the at least one light emitting diode 50 for the light engine 60 employed in the method is surface mount device (SMD) light emitting diodes (LED), chip on board (COB) light emitting diodes, or a combination thereof. The battery junction box 30 can engage a back surface S1 of the housing 10 by snap fit engagement. The snap fit engagement can be selected from the group consisting of cantilever snap fit, annular snap fit, torsional snap fit and a combination thereof. In other examples, the battery junction box 30 engages the back surface S1 of the housing 10 by nut and bolt arrangements or threaded fasteners.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Spatially relative terms, such as "forward", "back", "left", "right", "clockwise", "counter clockwise", "beneath," "below," "lower," "above," "upper," and the like, can be used herein for ease of description to describe one element's or feature's relationship to another element(s) or feature(s) as illustrated in the FIGs. It will be understood that the spatially relative terms are intended to encompass different orientations of the device in use or operation in addition to the orientation depicted in the FIGs.

Having described preferred embodiments of an emergency backup ready downlight, it is noted that modifications and variations can be made by persons skilled in the art considering the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A luminaire comprising:
   a housing containing a light engine including light emitting diodes (LEDs), in which the light engine is positioned to emit light through a light emission end of the housing, wherein the housing contains driver electronics for controlling power received by the luminaire for powering the light engine and an access opening on a back surface of the housing, in which the access opening exposes the driver electronics;
   a primary power line extends to the driver electronics through the housing;
   a battery junction box having an electrical pathway opening is engaged to the back surface of the housing; and
   a backup battery unit positioned at an exterior of the housing and outside a perimeter of the housing, wherein the battery backup unit is connected to the luminaire by wiring extending from the battery backup unit through the electrical pathway opening in the junction box to the driver electronics for the luminaire, wherein the backup battery unit includes a battery and a battery driver.

2. The luminaire of claim 1, wherein the battery driver regulates current from the battery to the light engine when the luminaire is being powered by the battery.

3. The luminaire of claim 1, wherein the battery driver provides that the battery is charged to capacity by said primary power line when the luminaire is not being powered by the backup battery unit.

4. The luminaire of claim 1, wherein the light emitting diodes are surface mount device (SMD) light emitting diodes (LED).

5. The luminaire of claim 1, wherein the light emitting diodes are chip on board (COB) light emitting diodes.

6. The luminaire of claim 1, wherein the housing further comprises an access door that is present on the access opening.

7. The luminaire of claim 1, wherein the battery junction box engages to the back surface of the housing by snap fit engagement.

8. The luminaire of claim 7, wherein the snap fit engagement is selected from the group consisting of cantilever snap fit, annular snap fit, torsional snap fit and a combination thereof.

9. The luminaire of claim 1, wherein the battery junction box engages the back surface of the housing by nut and bolt arrangements or threaded fasteners.

10. A luminaire comprising:
    a housing and a light engine, wherein the housing contains driver electronics for controlling power received by the luminaire for powering the light engine, wherein the luminaire includes an access opening, wherein the access opening exposes the driver electronics;
    a main power line extends to the driver electronics through the housing;
    a battery junction box having an electrical pathway opening is reversibly engaged to the access opening;
    a backup battery unit positioned at an exterior of the housing and outside a perimeter of the housing, wherein the battery backup unit is electrically connected to the luminaire through the electrical pathway opening in the battery junction box to the driver electronics for the luminaire, wherein the backup battery unit includes a battery and a battery driver, the battery driver regulating current from the battery to the light engine; and
    a main power junction box connected to the main power line of the luminaire and a battery line from the backup battery unit.

11. The luminaire of claim 10, wherein a light source for the light engine is selected from the group consisting of surface mount device (SMD) light emitting diodes (LE2D), chip on board (COB) light emitting diode or a combination thereof.

12. The luminaire of claim 10, wherein the housing further comprises an access door that is present on the access opening.

13. The luminaire of claim 10, wherein the battery junction box being said reversibly engaged to the back surface of the housing is by snap fit engagement.

14. The luminaire of claim 10, wherein the snap fit engagement is selected from the group consisting of cantilever snap fit, annular snap fit, torsional snap fit and a combination thereof.

15. The luminaire of claim 10 further comprising a test switch in electrical communication with the main power junction box.

16. A method of adding a backup power source to a luminaire comprising:
    exposing driver circuitry through an access opening through a surface of a housing for a luminaire, the housing containing a light engine that is positioned to emit light through a light emission end of the housing, wherein the driver circuitry controls power received by the luminaire for powering the light engine, the luminaire further including a primary power line extending to the driver circuitry through the housing;

connecting a battery junction box having an electrical pathway opening to the surface of the housing having the access opening; and connecting a backup battery unit to the luminaire from the battery backup unit through the electrical pathway opening in the battery junction box to the driver circuitry for the luminaire, wherein the backup battery unit includes a battery and a battery driver, the backup battery unit being positioned at an exterior of the housing and outside a perimeter of the housing.

17. The method of claim 16, wherein the battery driver regulates current from the battery to the light engine when the luminaire is being powered by the battery.

18. The method of claim 16, wherein the battery driver ensures that the battery is charged to capacity by said primary power line when the luminaire is not being powered by the backup battery unit.

19. The method of claim 16, wherein the at least one light emitting diode is surface mount device (SMD) light emitting diodes (LED), chip on board (COB) light emitting diodes, or a combination thereof.

20. The method of claim 16, wherein said connecting the battery junction box having the electrical pathway opening to the surface of the housing having the access opening is by reversible engagement.

* * * * *